United States Patent [19]

Dolan

[11] Patent Number: 5,415,424
[45] Date of Patent: May 16, 1995

[54] TRAILER SURGE BRAKE BREAKAWAY SYSTEM

[75] Inventor: Robert A. Dolan, Apache Junction, Ariz.

[73] Assignee: U-Haul International, Inc., Tempe, Ariz.

[21] Appl. No.: 119,491

[22] Filed: Sep. 9, 1993

[51] Int. Cl.6 .............................................. B60T 13/04
[52] U.S. Cl. .................................. 280/432; 280/457; 188/112 R
[58] Field of Search ............... 280/433, 457, 428, 432; 188/112 A, 112 R, 345

[56] References Cited

U.S. PATENT DOCUMENTS

| | | | |
|---|---|---|---|
| 1,966,977 | 7/1934 | Dyer | 188/112 |
| 2,070,884 | 2/1937 | Claus | 280/512 |
| 2,129,728 | 4/1938 | Berg | 280/457 |
| 2,149,189 | 2/1939 | Shaffer | 188/112 R |
| 2,342,907 | 2/1944 | Stall | 280/507 |
| 2,820,981 | 1/1958 | Klee | 16/63 |
| 3,007,552 | 11/1961 | Eksergian | 188/112 |
| 3,011,818 | 4/1959 | Matthiessen | 292/288 |
| 3,212,792 | 10/1965 | Reustle | 280/457 |
| 3,284,097 | 11/1966 | Koontz | 280/405.1 |
| 3,881,577 | 5/1975 | Wherry et al. | 188/112 |
| 3,921,766 | 11/1975 | May | 280/428 |
| 4,467,598 | 8/1984 | Wells | 59/78 |
| 5,195,768 | 3/1993 | Hendrix | 280/428 |

FOREIGN PATENT DOCUMENTS 530995   4/1955   Italy .
154317   2/1956   Sweden .

Primary Examiner—Margaret A. Focarino
Assistant Examiner—Victor E. Johnson
Attorney, Agent, or Firm—Spensley Horn Jubas & Lubitz

[57] ABSTRACT

In a breakaway trailer brake activating mechanism mounted on a trailer surge brake actuator, one end of a tension coil spring is attached to the breakaway activating mechanism while the other end of the spring is connected to an intermediate link on a breakaway chain. The connection is such that a surplus, predetermined number of breakaway chain links, forming a slack section of the breakaway chain, are connected between the ends of the spring. The spring prevents the slack section of the breakaway chain connected between the ends of the spring from being pulled tight so as to allow for tow vehicle turns even if the breakaway chain is incorrectly secured. Thus, during a sharp turn of the tow vehicle, the spring will allow the reserve links of the slack section of chain to extend but not so far as to cause the trailer brake to be activated. Should the trailer become separated from the towing vehicle during towing, however, the force exerted on the breakaway chain extends the spring to the point that the slack section of the breakaway chain is pulled tight thereby causing application of the trailer surge brakes by the breakaway brake activating mechanism.

5 Claims, 2 Drawing Sheets

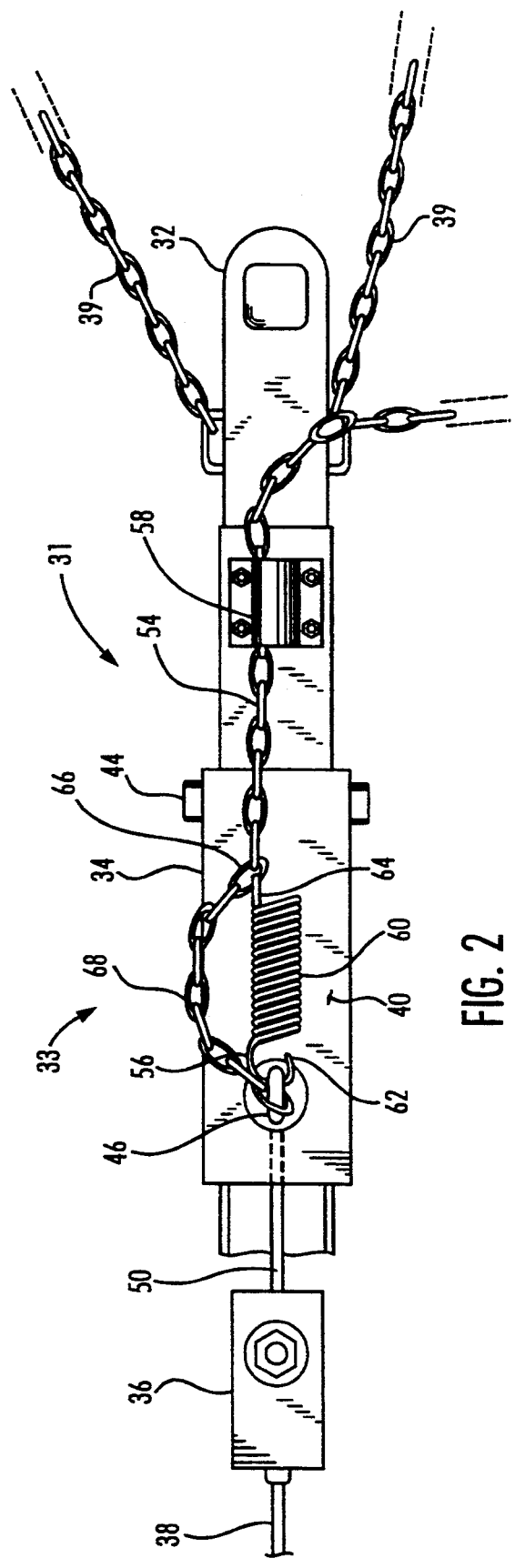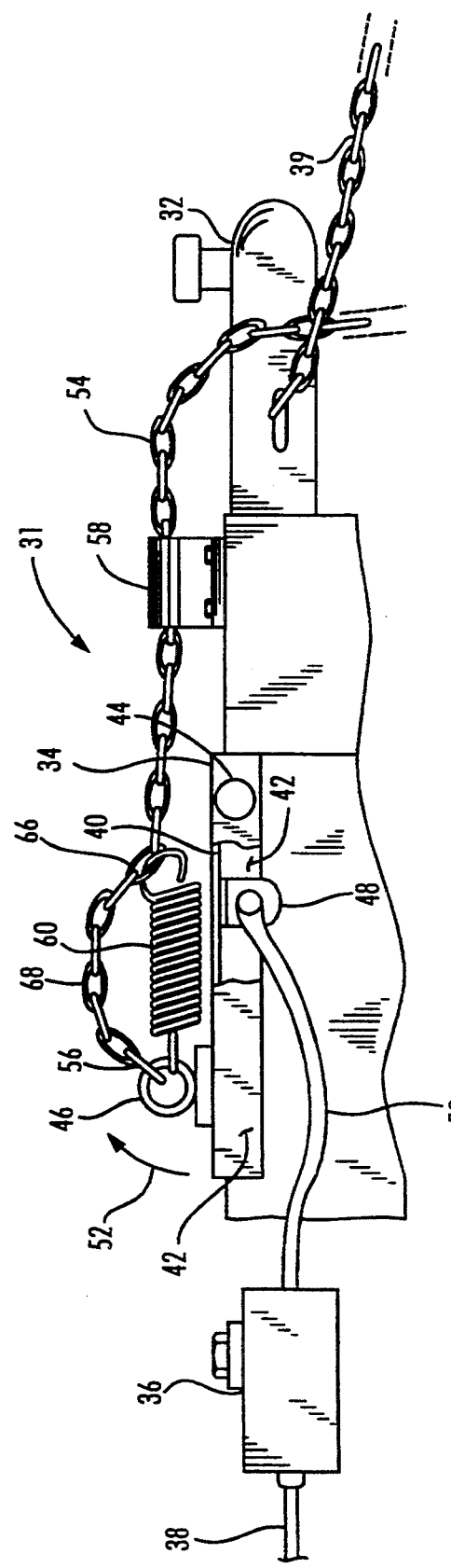

TRAILER SURGE BRAKE BREAKAWAY SYSTEM

FIELD OF THE INVENTION

The present invention relates generally to couplings connecting a tow vehicle, such as an automobile, and a towed vehicle such as a trailer equipped with brakes. More particularly, the invention relates to trailer surge brake breakaway systems forming part of such connections.

BACKGROUND OF THE INVENTION

Most trailer surge brakes incorporate a breakaway system to activate the trailer brakes if the trailer becomes disconnected from the tow vehicle. Such a system usually includes a flexible coupling typically in the form of a breakaway chain one end of which is connected to the tow vehicle and the other end of which is connected to a brake activating mechanism. If the trailer becomes separated from the tow vehicle, the breakaway chain pulls tight, thereby activating the trailer's brake system.

Occasionally, a breakaway chain is improperly secured so that there is not enough slack in the breakaway chain to allow the tow vehicle to make a turn without pulling on the breakaway chain and activating the trailer brake system.

Accordingly, an overall object of the present invention is to provide an improved trailer breakaway surge brake system.

It is another object of the present invention to provide an improved trailer breakaway system capable of accommodating turns of the tow vehicle without activating the trailer brake even if the breakaway chain is improperly secured, that is, with insufficient slack, while still providing for the proper operation of the breakaway brake system in the event the tow vehicle and trailer become separated.

SUMMARY OF THE INVENTION

In accordance with one specific, exemplary embodiment of the present invention, one end of a tension coil spring is attached to a breakaway activating mechanism in the form of a pedal on the brake actuator while the other end of the spring is connected to an intermediate link on the breakaway chain. The connection is such that a surplus, predetermined number of breakaway chain links, forming a slack section of the breakaway chain, are connected between the ends of the spring. The spring prevents the slack section of the breakaway chain connected between the ends of the spring from being pulled tight so as to allow for turns even if a breakaway chain is incorrectly secured. Thus, during a sharp turn of the tow vehicle, the spring will allow the reserve links of the slack section of chain to extend but not so far as to cause the trailer brakes to be activated. Should the trailer become separated from the towing vehicle during towing, however, the force exerted on the breakaway chain extends the spring to the point that the slack section of the breakaway chain is pulled tight thereby pulling the breakaway pedal so as to activate the trailer brakes.

BRIEF DESCRIPTION OF THE DRAWINGS

Further objects, advantages and features of the invention will become apparent from a reading of the detailed description of the preferred embodiment, below, when taken in conjunction with the accompanying drawings in which:

FIG. 2 is a top plan view of a portion of the forward end of a trailer tongue in accordance with the present invention; and FIG. 3 is a side elevation view, partly in section, of the trailer tongue of FIG. 2.

DETAILED DESCRIPTION OF THE PREFERRED EMBODIMENT

Figure 1:
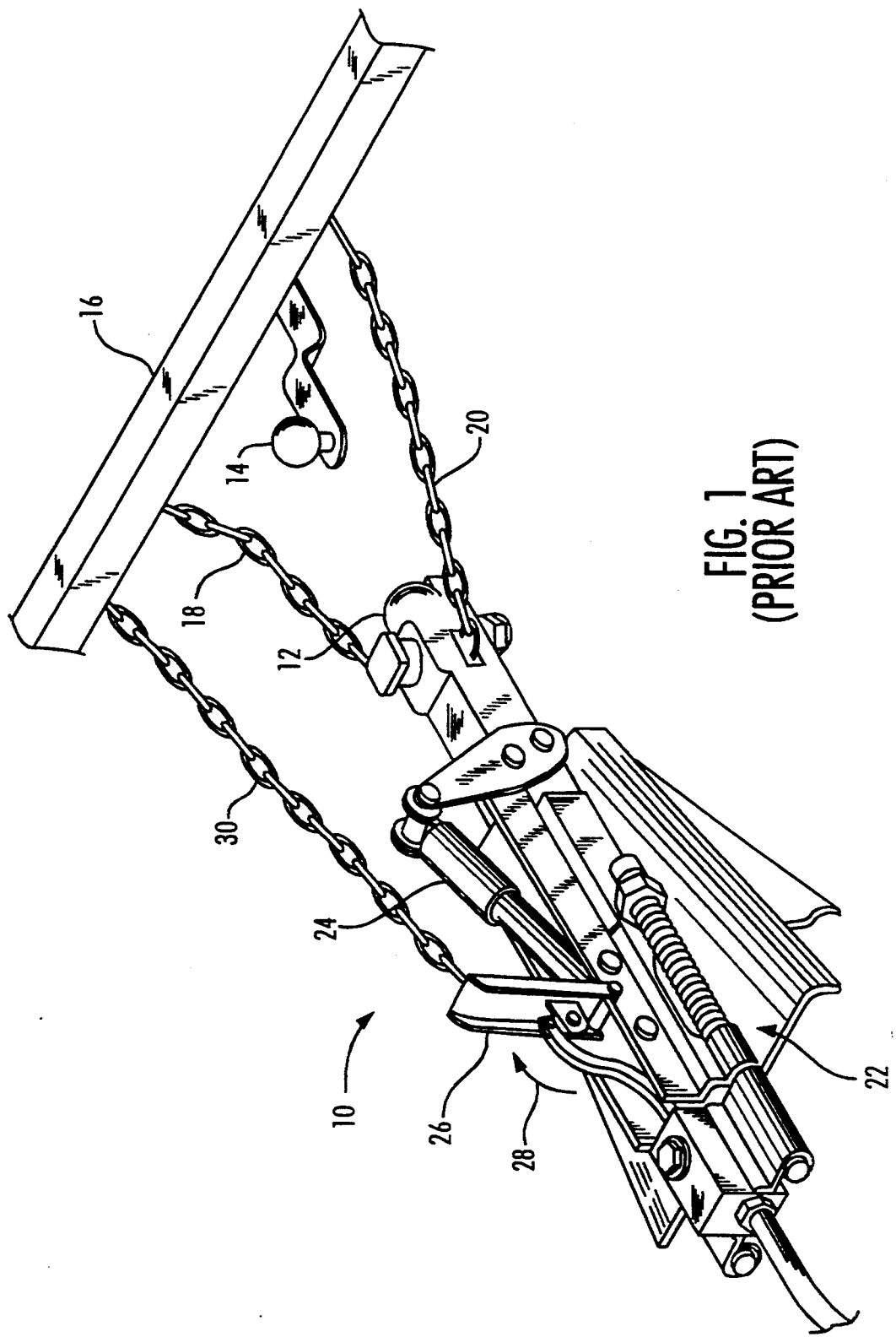
FIG. 1 is a perspective view of a portion of a prior art trailer tongue equipped with a breakaway surge brake mechanism and showing the relationship between a tow vehicle and the trailer tongue during a breakaway condition in which the trailer has become separated from the tow vehicle.

With reference to prior art FIG. 1, reference numeral 10 designates the forward portion of a trailer tongue having at its forward extremity a socket 12 adapted to receive a hitch ball 14 secured to the rear of an automobile or other tow vehicle a portion of which is identified by the numeral 16. It should be noted that the term "forward" used herein is intended to refer to an element or a portion of an element that is nearer the tow vehicle while the term "rear" is intended to refer to an element or portion of an element that is nearer the trailer. The rear end of the trailer tongue 10 is attached to the towed vehicle or trailer (not shown). As is known in the art, safety chains 18 and 20 are usually provided; these are coupled between the front end of the trailer tongue 10 and the rear of the tow vehicle 16 so that in the event the ball and socket become accidentally disconnected during towing the trailer will remain coupled to the tow vehicle. The trailer tongue 10 is also provided with a brake actuator 22 for applying the trailer brakes under normal operating conditions. For example, the trailer brakes are applied in the event of a forward surge of the trailer relative to the tow vehicle resulting, for example, from downhill travel. A shock absorber 24 may also be included to damp out relative movements between the tow vehicle and the trailer.

In addition, the brake actuator 22 includes a breakaway brake activating system for applying the trailer surge brakes in the event of disconnection of the towing vehicle and the trailer. This breakaway activating system includes a breakaway pedal 26 pivotally mounted on the brake actuator 22 and adapted to be pulled (as indicated by the arrow 28) from a horizontal, standby position to a vertical, brake activating position shown in FIG. 1. Movement of the breakaway pedal 26 to its vertical, brake activating position is controlled by a flexible coupling comprising, in the embodiment under consideration, a third chain or breakaway chain 30 coupling the rear end of the pedal 26 with the tow vehicle. Thus, the breakaway chain 30 is pulled tight and sets the trailer brakes automatically if the trailer accidentally becomes uncoupled. Like the safety chains 18 and 20, the forward extremity of the breakaway chain is hooked to the vehicle frame, bumper, hitch or understructure. It is important that there be enough slack in the breakaway chain 30 so that the breakaway pedal is not inadvertently tripped when the tow vehicle turns a corner. However, as already indicated, the breakaway chain is sometimes secured so that there is not enough slack to allow turning of the vehicle without pulling on the breakaway chain and inadvertently activating the trailer surge brake system.

With reference now to FIGS. 2 and 3 showing the present invention, there is provided a trailer tongue 31 having a rear extremity adapted to be attached to a trailer (not shown). The basic features of the trailer tongue 31 may be identical to the prior art. Thus, the trailer tongue 31 may include a forward extremity 32 defining a socket for receiving a hitch ball mounted on a tow vehicle (not shown) and a brake actuator 33 including a breakaway pedal 34 and a surge brake master cylinder 36 having a hydraulic line 38 adapted to be connected to the trailer brakes in a fashion well known in the art. The assembly shown in FIGS. 2 and 3 will also typically include safety chains 39 as in the prior art.

The breakaway pedal 34 may comprise a generally inverted U-shaped channel including a horizontal upper wall 40 and depending, opposed side flanges 42. The pedal 34 is pivotally mounted on the brake actuator by a horizontal pivot pin 44 positioned adjacent the forward end of the pedal 34 and passing through the opposed side flanges 42. Projecting upwardly from the upper wall 40 of the pedal 34 proximate the rear extremity thereof is an eye 46 which may be threadedly secured or welded to the upper wall of the pedal. A bracket 48 depends from the inside surface of the pedal wall 40 and is coupled to the master cylinder 36 by a link 50. It will thus be seen that, as in the prior art, pivoting of the breakaway pedal about the pin 44 (as shown by the arrow 52 in FIG. 3) actuates the master cylinder via the link 50. Instead of the pedal 34, it will be evident that a lever or switch mechanism may be employed.

The brake actuator 33 shown in FIGS. 2 and 3 also includes a flexible coupling in the form of a breakaway chain 54 having a rear end link 56 connected to the eye 46 on the brake pedal 34. The breakaway chain 54 also has a forward end (not shown) adapted to be connected, as in the prior art, to a point on the frame, bumper, hitch or understructure of the tow vehicle. The breakaway chain 54 passes through an inverted U-shaped guide 58 mounted on the brake actuator at a point forwardly of the pedal 34. The function of the guide 58 is to maintain the portion of the chain 54 between the guide 58 and the eye 46 in substantial longitudinal alignment with the trailer tongue.

Further in accordance with this embodiment of the invention, there is provided a resilient coupling in the form of tension coil spring 60 having a rear hook 62 attached to the pedal eye 46 and a forward hook 64 attached to a link 66 on the chain 54 intermediate the forward extremity and rear link 56 of the chain 54. Thus, it will be seen that a section 68 of the breakaway chain 54, between the rear link 56 and the intermediate link 66, is in parallel with the spring 60. The length of the chain section 68 is greater than the unextended length of the tension spring 60 so that normally there is slack in the chain section 68 as best seen in FIG. 2. The slack section 68 thus comprises a number of reserve or surplus links in the chain 54. In operation, in the event the breakaway chain 54 is incorrectly secured so that it does not have enough slack, the portion of the breakaway chain 54 forward of the spring 60 may begin to be pulled tight during turning of the tow vehicle. Instead of actuating the breakaway pedal under such a non-breakaway condition, however, the spring 60 begins to be extended thereby reducing but not eliminating the slack in the reserve chain section 68. On the other hand, in the event of a breakaway condition in which the trailer tongue 31 becomes separated from the hitch ball on the tow vehicle, the reserve section 68 of the chain 54 is pulled tight causing the breakaway pedal to pivot (as shown by the arrow 52 in FIG. 3) to cause activation of the trailer surge brakes via the master cylinder 36.

Inasmuch as various changes may be made in the structure described without departing from the spirit of the invention, it is intended that all such changes be included within the scope of the appended claims. For example, it will be evident that instead of the tension coil spring 60, a resilient strap of rubber or the like may be used, and that a stranded wire cable may be substituted for the breakaway chain 54. Further, it will be obvious that the spring 60 may be moved forwardly of the position shown in FIGS. 2 and 3 so that both ends of the spring are connected to intermediate links along the length of the chain 54. This breakaway system of the invention may also be adapted to other types of trailer braking systems.

What is claimed is:

1. A trailer tongue for coupling a tow vehicle and a trailer, the trailer having trailer surge brakes and the trailer tongue including a trailer surge brake actuator having a breakaway trailer brake activating mechanism, the trailer tongue further comprising:

a flexible, substantially non-elastic connector having a forward end adapted to be connected to the tow vehicle and a rear end attached to the breakaway trailer brake activating mechanism, the flexible connector including a portion having a first end and a second end; and a resilient tensioning member having a first end and a second end coupled, respectively, to the first end and the second end of said portion of the flexible connector, the tensioning member having an unextended state in which state the tensioning member yieldably maintains slack in said portion of the flexible connector, wherein a pull on the flexible connector extends the resilient tensioning member to remove slack from said portion of the flexible connector and wherein, upon breakaway of the tow vehicle from the trailer, a sufficient pull is applied to the flexible connector to further extend the resilient tensioning member and remove all slack from said portion of the flexible connector, thereby activating the breakaway trailer brake activating mechanism to apply the trailer surge brakes.

2. A trailer tongue, as defined in claim 1, in which:
said portion of the flexible connector is intermediate the forward and rear ends of the flexible connector.

3. A trailer tongue, as defined in claim 1, in which:
the second end of said portion of the flexible connector is substantially coterminous with the rear end of the flexible connector.

4. A trailer tongue, as defined in claim 1, in which:
the flexible connector comprises a breakaway chain consisting of a series of connected chain links, said portion of the flexible connector comprising a predetermined number of said chain links; and in which
the resilient tensioning member comprises a tension coil spring.

5. A trailer tongue, as defined in claim 1, further including:
a guide mounted on the trailer tongue forwardly of said portion of the flexible connector, the flexible connector passing through the guide.

* * * * *